(12) United States Patent
Anderberg

(10) Patent No.: US 8,177,236 B2
(45) Date of Patent: May 15, 2012

(54) SEAL ASSEMBLY

(75) Inventor: Göran Anderberg, Landskrona (SE)

(73) Assignee: Huhnseal AB, Landskrona (SE)

( * ) Notice: Subject to any disclaimer, the term of this patent is extended or adjusted under 35 U.S.C. 154(b) by 652 days.

(21) Appl. No.: 11/993,158

(22) PCT Filed: Jun. 27, 2006

(86) PCT No.: PCT/SE2006/050222
§ 371 (c)(1),
(2), (4) Date: May 6, 2009

(87) PCT Pub. No.: WO2007/001233
PCT Pub. Date: Jan. 4, 2007

(65) Prior Publication Data
US 2010/0032907 A1    Feb. 11, 2010

(30) Foreign Application Priority Data
Jun. 27, 2005  (SE) .................................... 0501492

(51) Int. Cl.
*F16J 15/34* (2006.01)
(52) U.S. Cl. .................................................... 277/408
(58) Field of Classification Search .......... 277/370–371, 277/408, 431–432
See application file for complete search history.

(56) References Cited

U.S. PATENT DOCUMENTS

| | | | |
|---|---|---|---|
| 3,489,419 A * | 1/1970 | Stratienko | 277/408 |
| 4,466,619 A | 8/1984 | Adams | |
| 4,560,173 A | 12/1985 | Adams et al. | |
| 5,217,234 A | 6/1993 | Hornsby | |
| 5,498,007 A * | 3/1996 | Kulkarni et al. | 277/400 |
| 5,727,792 A * | 3/1998 | Rockwood | 277/364 |
| 5,909,878 A * | 6/1999 | Schrufer et al. | 277/398 |
| 5,921,552 A * | 7/1999 | Trackwell et al. | 277/350 |
| 6,210,107 B1 | 4/2001 | Volden et al. | |
| 6,296,254 B1 | 10/2001 | Young | |
| 6,446,975 B1 * | 9/2002 | Bratthall | 277/366 |
| 6,695,315 B1 * | 2/2004 | Anderberg | 277/369 |

FOREIGN PATENT DOCUMENTS

CH        616 994        4/1980

* cited by examiner

*Primary Examiner* — Thomas Beach
*Assistant Examiner* — Nicholas L Foster
(74) *Attorney, Agent, or Firm* — Larson & Larson, P.A.; Frank Liebenow; Justin Miller

(57) ABSTRACT

A seal assembly (100) for sealing a rotatable shaft entering a workspace is provided, the seal 5 assembly (100) comprising first and second sets of seal rings (110', 110"; 170, 170') separated by a space defined by the seal ring sets (110', 110"; 170, 170'), an outer surface of a shaft sleeve (120) or the shaft and an inner surface of a body (140, 150) circumventing 10 the outer surface of the shaft sleeve (120) or the shaft and filled with a lubricating and/or cooling fluid, wherein the outer surface of the shaft sleeve (120) or the shaft is provided with grooves (120'), or any other irregular surface, wherein the space is 15 provided with at least one fluid directing member (160, 160') that is configured to provide homogenous distribution of lubrication and/or homogenous distribution of cooling over a substantial part of the seal assembly (100) in interaction with the shaft 20 sleeve or the shaft. A method and a system are also provided.

19 Claims, 5 Drawing Sheets

SEAL ASSEMBLY

FIELD OF THE INVENTION

The present invention relates to a seal assembly for sealing a rotatable shaft entering a workspace. The seal assembly comprises first and second sets of seal rings separated by a space defined by the seal ring sets, an outer surface of a shaft sleeve or the shaft and an inner surface of a body circumventing the outer surface of the shaft sleeve or the shaft. The space is filled with a lubricating and/or cooling medium.

BACKGROUND OF THE INVENTION

In the art of pumping, stirring, or any other process requiring rotation, a rotational movement must be transferred from a power source into a workspace. In most cases, a shaft connected to a motor transfers the rotational movement into the work space, that e.g. could be a vessel, a pump housing or the like. In order to avoid leakage, some kind of seal must be used between the shaft and the vessel or the pump house. Especially if the content in the pump house is abrasive or otherwise aggressive, it is necessary to stop the content from leaking, since the abrasive content otherwise might deteriorate or destroy the bearings and other components.

One common way to design a seal for a rotatable shaft is to arrange two flat, axially opposing sliding surfaces, wherein one sliding surface is connected to the shaft, and one sliding surface is connected to the pump housing. A design like this is, however, lubricated by the product to be treated, which is not beneficial from a wear point of view.

A more robust design is to use two sets of axially opposing sliding surfaces with an intermediate space restricted by the pump housing, the shaft and the sliding surfaces. The intermediate space is filled with a lubricating fluid preferably having a higher pressure than the medium to be treated in the workspace. This allows lubricating fluid to "bleed" out through the sliding surfaces and provides lubrication between those surfaces. A "bleeding" of lubricating fluid also stops the medium to be treated from entering towards the sliding surfaces, which is crucial in order to minimize wear of the sliding surfaces.

One other benefit that can be achieved by the lubricating fluid is cooling of the seal assembly by allowing lubricating fluid to enter the intermediate space at one position and allowing the lubricating fluid to escape the intermediate space at another position. This cooling arrangement requires, however, an external pump circulating lubricating fluid; obviously, such a pump adds a significant cost to the sealing arrangement, and it also adds a heat load to the fluid, which increases the temperature of the fluid. Furthermore, the external pump may fail, causing overheating and/or loss of lubrication, which ultimately may lead to seal seizure or premature wear.

U.S. Pat. No. 4,466,619 A1 discloses a mechanical seal construction having as an integral part thereof a pumping structure for effecting circulation of buffer fluid. The shaft sleeve is provided with irregularities thereon, such as a series of circumferentially spaced slots, so that the shaft sleeve functions as a pumping rotor. The surrounding seal stator has supply and discharge ports extending radially therethrough, which ports extend substantially tangentially with respect to the shaft sleeve so that the latter, due to its rotation, will pump and hence circulate the cooling or buffer fluid through the buffer chamber. However, the mechanical seal construction of U.S. Pat. No. 4,466,619 A1 does merely provide local shaft lubrication and cooling over a very limited area, which means that some parts of the shaft experience less cooling which leads to short shaft lifetime and poor cost-effectiveness of the disclosed construction.

U.S. Pat. No. 5,217,234 discloses a mechanical seal with barrier fluid circulation system, wherein an annular inner flange extending from a gland plate having inlet and outlet openings is provided with a series of notches between the inlet and the outlet openings, the notches running in the direction of the rotation of the shaft around which the seal is attached. However, the mechanical seal with barrier fluid circulation system according to U.S. Pat. No. 5,217,234 does merely provide local shaft cooling over a very limited area, which means that some parts of the shaft experience less cooling which leads to short shaft lifetime and poor cost-effectiveness.

U.S. Pat. No. 4,560,173 A1 discloses a mechanical seal assembly with coolant circulation structure, wherein a stationary ring, preferably the gland ring, is provided with a circulation inducing dam positioned within an annular chamber defined between the inner and outer seals. The dam extends from the downstream side of an outlet to the upstream side of an inlet, whereby rotation of the shaft effectively induces coolant to flow into the chamber through the inlet and then around the chamber to the outlet. However, the mechanical seal with coolant circulation structure according to U.S. Pat. No. 4,560,173 A1 does merely provide local shaft cooling over a very limited area, which means that some parts of the shaft will experience less cooling which leads to short shaft lifetime and poor cost-effectiveness.

U.S. Pat. No. 6,210,107 B1 discloses barrier seal systems for sealing the annular space between a housing and a rotating shaft that extends through a bore in the housing. The seal system has inboard and outboard mechanical end face seals. The inboard seal faces have spiral grooves for pumping a buffer fluid from a buffer chamber between the two seals toward the high-pressure side of the inboard seal. For high-pressure applications the, the buffer fluid may be pressurized and a pumping ring may be included in the outboard seal to circulate buffer fluid. However, U.S. Pat. No. 6,210,107 B1 does merely provide local shaft cooling over a very limited area, which means that some parts of the shaft experience less cooling which leads to short shaft lifetime and poor cost-effectiveness.

Hence, there is a need for sealing assemblies having a prolonged lifetime.

A problem to be solved by the present invention is to prolong the lifetime and safety of operation of a seal assembly allowing for increased flexibility and cost-effectiveness.

SUMMARY OF THE INVENTION

Accordingly, the present invention preferably seeks to mitigate, alleviate or eliminate one or more of the above-identified deficiencies in the art and disadvantages singly or in any combination and solves at least the above mentioned problems by providing an assembly, method and system that prolongs the lifetime of a seal assembly, according to the appended patent claims.

According to one aspect of the invention, a seal assembly for sealing a rotatable shaft entering a workspace is provided, the seal assembly comprising first and second sets of seal rings separated by a space defined by the seal ring sets, an outer surface of a shaft sleeve or the shaft and an inner surface of a body circumventing the outer surface of the shaft sleeve or the shaft and filled with a lubricating and/or cooling fluid, wherein the outer surface of the shaft sleeve or the shaft is provided with grooves, or any other irregular surface, wherein the space is provided with at least one fluid directing member that is configured to provide homogenous distribution of lubrication and/or homogenous distribution of cooling over a substantial or significant part of the seal assembly in interaction with the shaft sleeve or the shaft.

According to another aspect of the invention, a method of a seal assembly for sealing a rotatable shaft entering a workspace is provided, the seal assembly comprising first and second sets of seal rings separated by a space defined by the seal ring sets, an outer surface of a shaft sleeve or the shaft and an inner surface of a body circumventing the outer surface of the shaft sleeve or the shaft and filled with a lubricating and/or cooling fluid, wherein the outer surface of the shaft sleeve or the shaft being provided with grooves, or any other irregular surface, the space is provided with at least one fluid directing member, wherein the at least one fluid directing member providing homogenous distribution of fluid lubrication and/or homogenous distribution of fluid cooling over a substantial or significant part of the seal assembly by means of the at least one fluid directing member interacting with the shaft sleeve or the shaft.

According to yet another aspect of the invention, a system for cooling and/or lubricating a seal assembly is provided, wherein internal surfaces of the seal assembly are designed to provide a pumping action of a cooling and/or lubricating fluid, wherein inlet and/or outlet openings for cooling and/or lubricating fluid to and from the seal assembly are connected to a common source for cooling and/or lubricating fluid, and wherein at least one fluid directing member that is configured to provide homogenous distribution of lubrication and/or cooling over a substantial or significant part of the seal assembly in interaction with the internal surfaces are provided.

According to a further aspect of the invention, a system comprising a seal assembly for sealing a rotatable shaft entering a workspace is provided, the seal assembly comprising first and second sets of seal rings separated by a space defined by the seal ring sets, an outer surface of a shaft sleeve or the shaft and an inner surface of a body circumventing the outer surface of the shaft sleeve or the shaft and filled with a lubricating and/or cooling fluid, wherein the outer surface of the shaft sleeve or the shaft is provided with grooves, or any other irregular surface, and wherein the space is provided with at least one fluid directing member that is configured to provide homogenous distribution of lubrication and/or homogenous distribution of cooling over a substantial or significant part of the seal assembly in interaction with the shaft sleeve or the shaft.

Embodiments of the present invention provide for homogenous cooling of a seal assembly prolonging the lifetime and cost-effectiveness of the seal assembly.

BRIEF DESCRIPTION OF THE DRAWINGS

These and other aspects, features and advantages of which the invention is capable of will be apparent and elucidated from the following description of embodiments of the present invention, reference being made to the accompanying drawings, in which.

DESCRIPTION OF EMBODIMENTS

The following description focuses on an embodiment of the present invention applicable to a seal assembly. However, it will be appreciated that the invention is not limited to this application but may be applied to many other constructions involving utilizing the rotation of a shaft to enable homogenous cooling of the construction.

Figure 1:
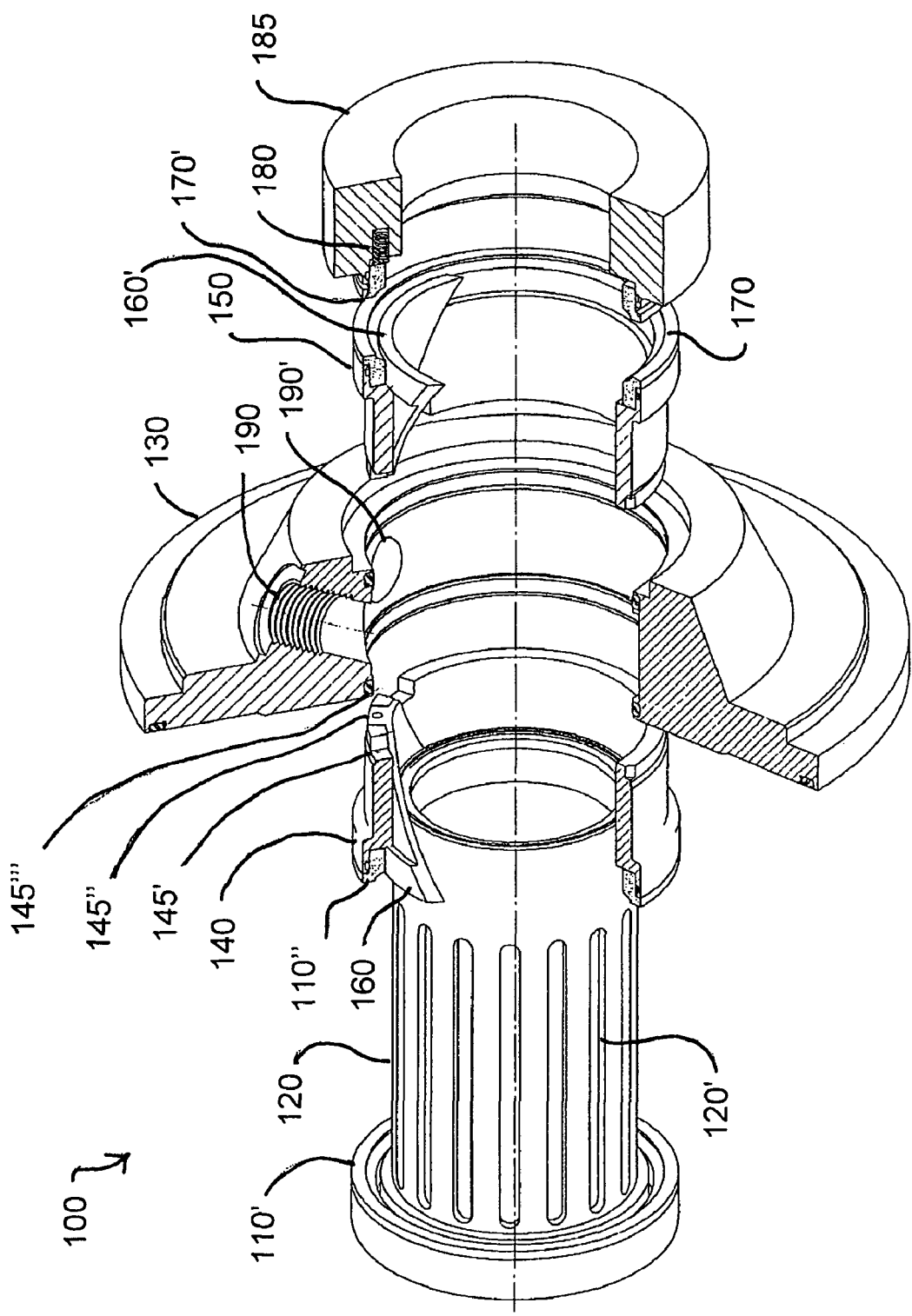
FIG. 1 is an exploded perspective view of a seal assembly according to an embodiment of the present invention.

In FIG. 1, a seal assembly 100 according to an embodiment of the present invention is shown in an exploded perspective view. The sealing assembly 100 comprises first and second silicon carbide seal rings 110' and 110", which are mounted in a mutually gliding relationship. The seal rings may also be made from carbon, tungsten carbide, silicon nitride, PTFE, or any plastic material. The seal assembly 100 also comprises a shaft sleeve 120 provided with axially extending grooves 120'. A seal housing 130 houses two seal ring bearing members 140, 150, which each are provided with corresponding recesses 145', 145", 145'''. The ring bearing members form a body surrounding the shaft sleeve 120. Inside the two seal ring bearing members 140, 150, two fluid directing members 160, 160' are situated. On the side of the seal housing 130 that is opposite of the side where the first and second seal rings are situated, third and fourth seal rings 170, 170' are mounted in a mutually gliding relationship. A number of helical compression springs 180 are arranged to provide a pressure between the third and fourth seal rings 170, 170'. The helical springs 180 are mounted in an end piece 185.

The seal ring bearing members 140, 150 are mounted in the seal housing 130 in a manner that allows a certain axial movement within the seal housing 130. This is achieved by allowing a certain clearance between the seal ring bearing members 140, 150 and the seal housing 130; rotational movement is avoided by a tap 147 (see FIG. 2), fitting into corresponding recesses. Hence, the pressure applied by the helical springs 180 will be transferred, via the fourth and third seal rings 170', 170 and the seal ring bearing members 140, 150 to the first and second seal rings 110', 110", hence securing a mutual pressure between the rings 110', 110" and 170, 170', which ensures a sealing contact.

The recesses 145' and 145" are connected to the outside of the pump housing 130 by bores 190, 190'.

Figure 2:
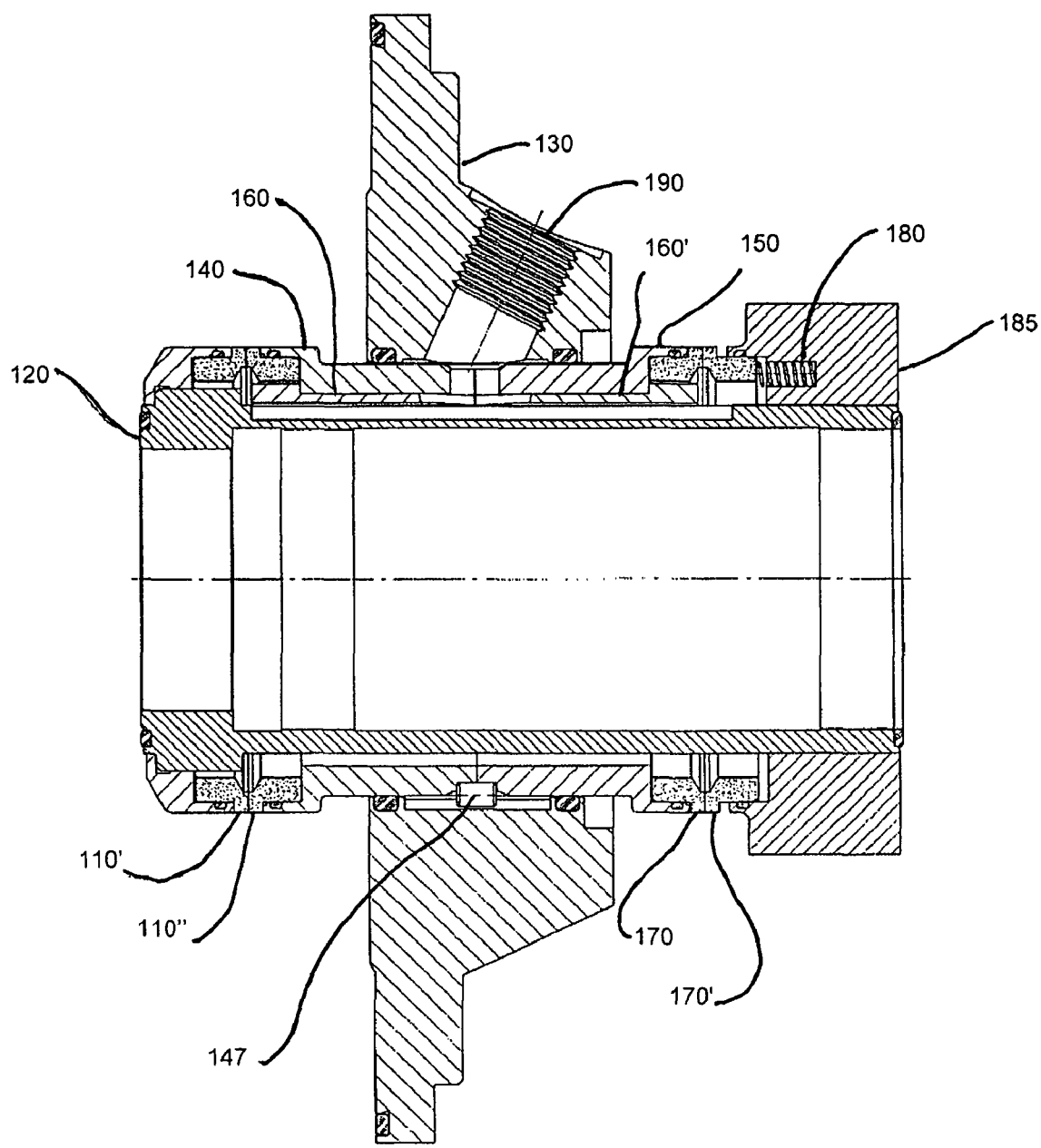
FIG. 2 is a sectional side view of a mounted seal assembly according to an embodiment of the present invention.

In FIG. 2, the seal assembly 100 of FIG. 1 is shown in a mounted configuration. With reference to this drawing, the basic function of the seal assembly is clearly demonstrated hereinafter.

The seal housing 130, the seal ring bearing members 140, 150, the second and fourth seal rings 110' and 170', respectively, the fluid directing members 160, 160 and the end piece 185 do not co-rotate with a shaft (not shown) housed in the shaft sleeve 120. Only the shaft sleeve 120, the end piece 185, and the first and third seal rings 110', 170', respectively, rotate.

Figure 3:
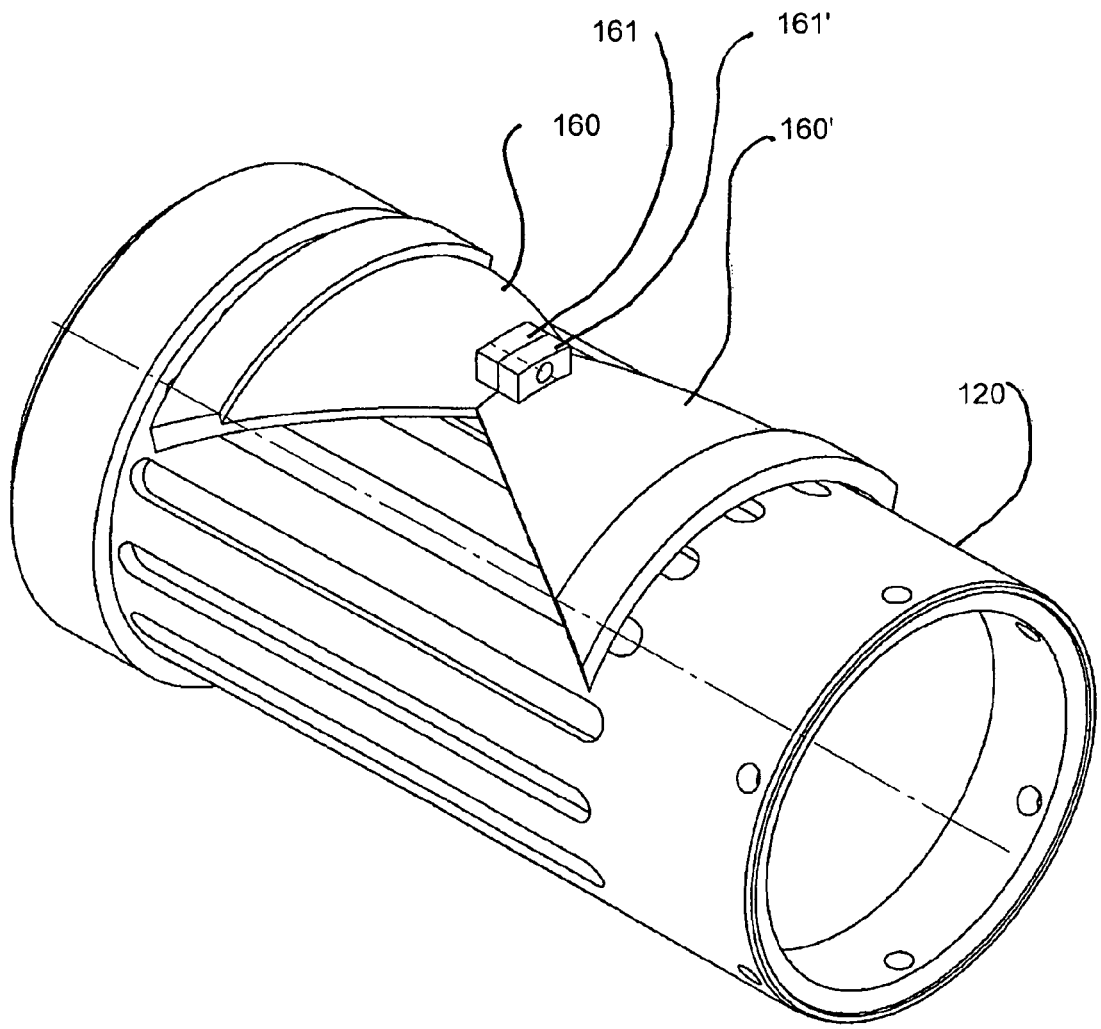
FIG. 3 is a perspective view showing the relationship between two fluid directing members and a shaft sleeve according to the present invention.

In FIG. 3, the relationship between the shaft sleeve 120 and the fluid directing members 160, 160' is shown. The fluid directing members 160, 160' each comprises a shoulder 161, 161', respectively, which shoulders are sized to fit into the recesses 145". This stops the fluid directing members from rotating with the shaft sleeve 120.

Figure 4:
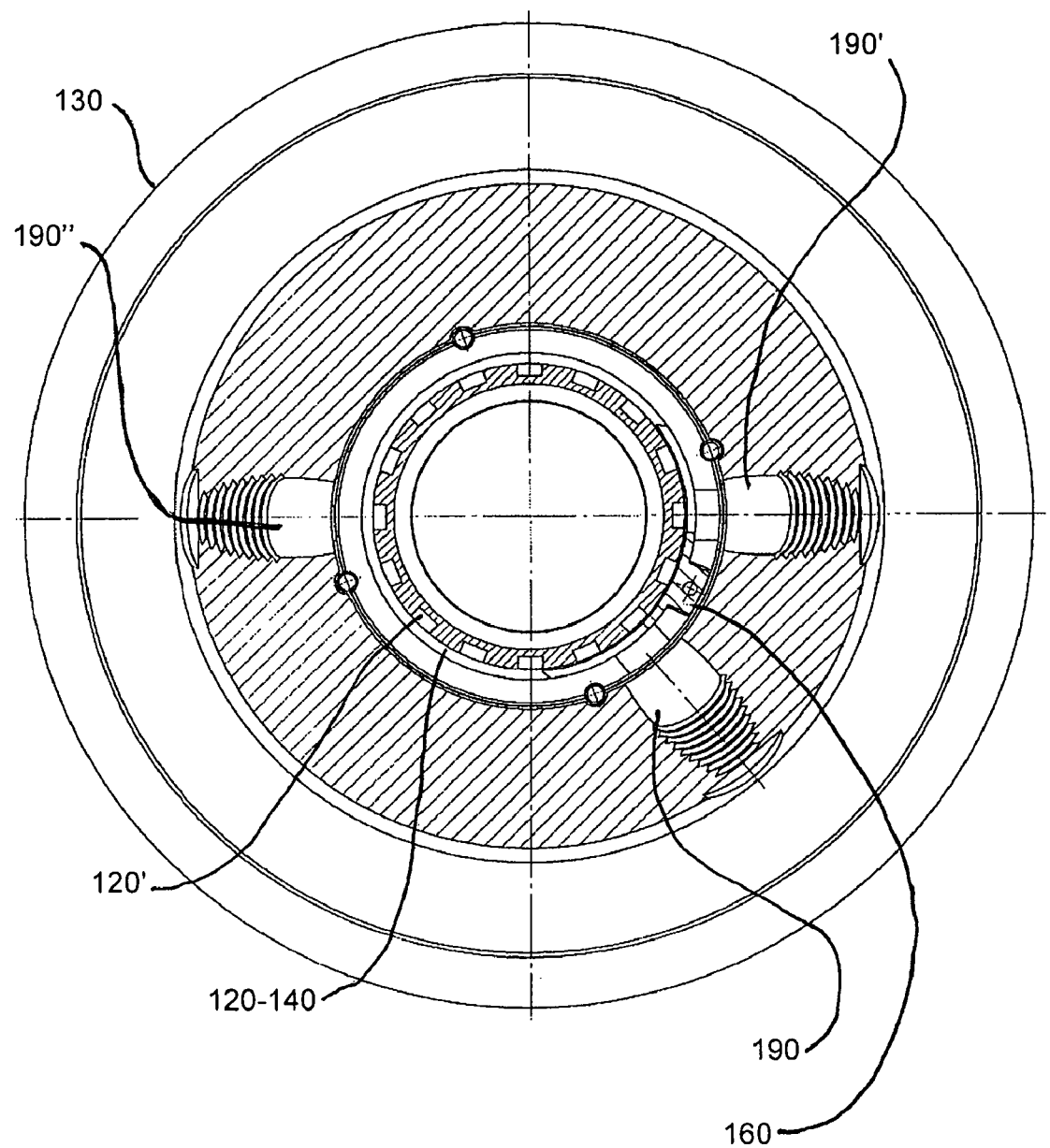
FIG. 4 is a sectional end view showing the gap between a shaft sleeve and a surrounding body according to the present invention.

In FIG. 4, the relationship between the openings 190, 190' and the fluid directing members 160, 160' is shown. As can be seen, the openings 190, 190' opens on either side of the fluid directing members 160, 160'. This arrangement explains the pumping action achieved by the seal assembly 100; as can be seen in FIG. 4, the fluid directing members 160, 160' fills a gap 120-140 between the shaft sleeve 120 and the ring bearing members 140, 150. As will be explained later, the grooves 120' of the shaft sleeve 120 will push fluid in the direction of rotation in the gap 120-140. Since the fluid directing members 160, 160 interrupt the gap, a pressure build-up is created on the side of the fluid directing members 160, 160' that faces the direction of rotation, whereas a pressure decrease will be created on the other side; hence, a pumping effect is created between the openings 190 and 190'. A drainage opening 190" is provided for allowing drainage of the seal assembly.

Figure 5:
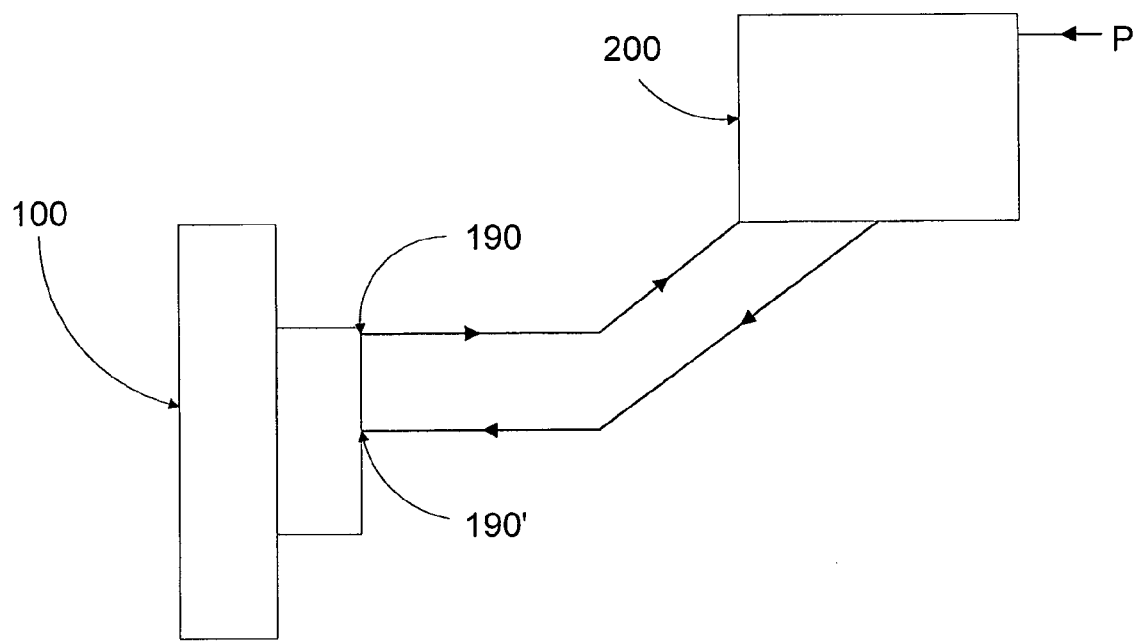
FIG. 5 is a schematic view of a system according to the present invention.

In order to supply the space defined by the seal rings 110', 110", 170, 170', the shaft sleeve 120 and the seal ring bearing members 140, 150 with a lubricating fluid, the bores 190, 190' (FIG. 1) are in fluid communication with both the recesses 145', 145''' and with an external fluid container 200 (FIG. 5), which in some cases might be pressurised by a pressure P.

According to the embodiment of the invention, the lubricating fluid experiences a pumping action in the seal assembly 100. Due to the arrangement of the grooves 120' on the shaft sleeve 120, and the provision of the fluid directing members 140 and 150, the lubricating fluid will be drawn into the seal assembly 100 from either of the bores 190, 190' (depending on shaft rotation direction), and be expelled from the other of the openings. This is very beneficial, since no external pump must be used to provide a cooling flow of lubricating fluid.

The pumping effect is achieved due to the area decrease obtained by the provision of the fluid direction members 160, 160', much in the same manner as for a side channel blower. This effect basically emanates from the effect that the grooves 120'(and the naturally occurring intermediate ridges) will push lubricating fluid in the direction of rotation; if there is a large clearance between the grooves of the shaft sleeve and the ring bearing members 140, 150, more lubricating fluid will be pushed by the grooves than where there is a smaller clearance. In the seal assembly according to the present embodiment of the invention, there is a relatively large clearance where there is no fluid directing member, but a relatively small clearance between the grooves and the fluid directing members 160, 160'. Hence, there will be a pressure build up on the side of the fluid directing members that face the direction of rotation of the shaft sleeve 120, and a pressure decrease on the side of the fluid direction members that faces away from the direction of rotation. As mentioned earlier, the bores 190, 190' are in fluid communication with both the recesses 145', 145''' and with a source of lubricating fluid. Since the recesses 145', 145''' are placed on either sides of the fluid directing members 140, 150, there will be a pressure difference between the recesses 145' and 145'''. This pressure difference may in use of the sealing assembly 100 be used to drive a circulation of lubricating fluid to and from the source of lubricating fluid.

As can be seen on FIGS. 1 and 3, the shape of the fluid directing members is parallel-trapezoidal; on the side of the fluid directing members facing the direction of rotation, this parallel-trapezoidal shape will create a fluid flow having an axial component from the ends of the shaft sleeve 120 towards the centre of the shaft sleeve, where either of the recesses 145' and 145''' is located. This is beneficial due to the fact that most of the heat is produced within the ring sets 110', 110" and 170, 170', respectively, and these ring sets are placed near the ends of the shaft sleeve. Fluid directing members 160, 160' provide homogenous distribution of lubricant and coolant over a substantial part of seal assembly 100 in interaction with said shaft sleeve or said shaft. Lubrication and/or cooling is provided over a substantial part of the seal assembly 100 in interaction with a shaft sleeve or shaft. Hence, a more efficient homogenous cooling is achieved, providing a longer service life of assembly 100.

The fluid directing members according to a practical implementation of an embodiment of the present invention may currently enable homogenous cooling and lubrication over approximately 100 mm along the shaft compared to approximately 20 mm for prior art solutions. This means that the fluid directing members increase the width of cooling and lubrication along the shaft by at least five times compared to the prior art solutions.

As implied earlier, it is in some cases beneficial if the lubricating fluid is pressurised. In connection with the present invention, it is very easy to supply the seal assembly with pressurised lubricating fluid, since it is only necessary to pressurise a closed vessel. With the prior art seal assemblies, it was necessary to pressurise both a closed vessel and a circulating pump. A seal assembly according to a practical implementation of an embodiment is capable of circulating two litres of fluid per minute at a shaft rotation speed of 1500 rpm.

The above description is only to be seen as exemplary. Many diversions could be made from it without departing from the scope of the invention as it is defined in the appended claims.

For example, the shape of the fluid directing members may differ from the demonstrated parallel-trapezoidal shape. In an embodiment, the fluid directing members may have the shape of a square. In another embodiment, the fluid directing members have rhombic shapes. If a rhombic shape of the fluid directing members is used, it is provided for fluid being let in at one end of the seal assembly and expelled at the other end. This is advantageous over the prior art from a cooling point of view, which both prolongs the lifetime of the seal assembly and provides homogenous cooling over a large portion of the seal assembly 100.

In a further embodiment the fluid directing members are integrated into one piece with the seal rings (110', 110", 170, 170'), of a material such as Silicon Carbide.

In another embodiment of the invention the fluid directing members are provided in one integral, i.e. in one piece, instead of plural pieces 160, 160'. This may decrease manufacturing and assembly costs of the seal assembly 100.

In an embodiment of the invention, the cooling and/or lubricating fluid is oil, but in other embodiments, the fluid may be other liquids, such as any alcohol, glycerine, or water, depending on specific application requirements.

Ceramic seal rings 110', 110", 170, 170', may be provided with diamond coated surfaces, which are contacting other rings. This reduces the wear and may as well further decrease the temperature increase in the seal assembly.

In the described embodiment, grooves 120' provide the pumping action between the recesses 145' and 145'''. These grooves may in other embodiments however be substituted with knurls, bumps or any other surface giving a large friction between the fluid and the shaft sleeve 120.

Furthermore, the embodiment described with reference to the Figures uses a shaft sleeve 120. It is however also contemplated that the friction enhancing may directly be provided at the shaft (not shown), which renders the shaft sleeve unnecessary.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A seal assembly for sealing a rotatable shaft entering a workspace, said seal assembly comprising:
   first and second sets of seal rings separated by a space defined by the seal ring sets,
   an outer surface of a shaft sleeve or shaft provided with an irregular surface,
   an inner surface of a body circumventing the outer surface of the shaft sleeve or the shaft and filled with a lubricating and/or cooling fluid,
   a gap separating the outer surface of the shaft sleeve or shaft and the inner surface of the body,
   at least one stationary fluid directing member extending from the inner surface of the body and into the gap,
   a lubricating and/or cooling fluid input opening into said seal assembly positioned in the inner surface of the body on a first side of the fluid directing member,
   a lubricating and/or cooling fluid outlet opening into said seal assembly positioned in the inner surface of the body on a second side of the fluid directing member,
   wherein
   the at least one stationary fluid directing member comprises a surface that extends axially in apposition to said shaft sleeve or said shaft, and
   a first side of the at least one stationary fluid directing member facing the direction of rotation of said shaft sleeve or said shaft extends axially and obliquely from said output opening and thereby creates a fluid flow in said lubrication and/or cooling fluid towards or away from the first and/or second sets of seal rings during rotation of said shaft sleeve or said shaft.

2. The seal assembly according to claim 1, wherein said input opening and said output opening are located adjacent to said at least one fluid directing member.

3. The seal assembly according to claim 1, wherein a second side of said fluid directing member opposite the first side of said fluid directing member extends axially and obliquely from said input opening and thereby creates a fluid flow in said lubrication and/or cooling fluid toward or away from the first and/or second sets of seal rings during rotation of said shaft sleeve or said shaft.

4. The seal assembly according to claim 1, wherein the input and output openings are connected to a common pressurized vessel containing cooling and/or lubricating fluid.

5. The seal assembly according to claim 1, wherein said at least one fluid directing member has a parallel-trapezoidal shape.

6. The seal assembly according to claim 1, wherein the seal rings are made from silicon carbide.

7. The seal assembly according to claim 1, wherein the seal rings are diamond coated.

8. The seal assembly according to claim 1, wherein said at least one fluid directing member is integrated into one piece with said seal rings.

9. The seal assembly according to claim 1, wherein the lubricating and/or cooling fluid is oil.

10. The seal assembly according to claim 4, wherein the pressure in said pressurized vessel is higher than a pressure in the workspace.

11. The seal assembly according to claim 1, wherein the cross-section of said at least one fluid directing member increases in the rotating direction from the input opening and decreases in the rotating direction to the output opening.

12. The seal assembly according to claim 1, wherein said at least one stationary fluid directing member of said seal assembly extends about 100 mm axially along said outer surface of said shaft sleeve.

13. A method for sealing a rotatable shaft entering a workspace within a seal assembly, said seal assembly comprising first and second sets of seal rings separated by a space defined by the seal ring sets, an outer surface of a shaft sleeve or a shaft and an inner surface of a body circumventing the outer surface of the shaft sleeve or the shaft and filled with a lubricating and/or cooling fluid, wherein said outer surface of said shaft sleeve or said shaft being provided with an irregular surface, said method comprising:
   creating a flow in said lubricating and/or cooling fluid from an input opening of said seal assembly toward said first and/or second sets of seal rings by means of rotating the shaft sleeve or shaft relative to at least one stationary fluid directing member having at least one axially extending surface in apposition with said shaft sleeve or said shaft, and
   creating a flow in said lubricating and/or cooling fluid from said first and/or second sets of seal rings towards an output opening of said seal assembly by means of rotating the shaft sleeve or shaft relative to at least one stationary fluid directing member having at least one axially extending surface in apposition with said shaft sleeve or said shaft,
   wherein:
   said at least one stationary fluid directing member extends from the inner surface of the body circumventing the outer surface of the shaft sleeve or the shaft into a gap separating said inner surface from the outer surface of the shaft sleeve or the shaft and,
   a first side of the at least one stationary fluid directing member facing the direction of rotation of said shaft sleeve or said shaft extends axially and obliquely from said output opening and thereby creates a fluid flow in said lubricating and/or cooling fluid towards or away from the first and/or second sets of seal rings during rotation of said shaft sleeve or said shaft.

14. The method according to claim 13, further comprising pressurizing the source of cooling and/or lubricating fluid.

15. A system for cooling and/or lubricating a seal assembly, wherein said system comprises:
   internal surfaces of the seal assembly configured to provide a pumping action of a cooling and/or lubricating fluid,
   inlet and/or outlet openings for flowing cooling and/or lubricating fluid to and from the seal assembly connected to a common source for cooling and/or lubricating fluid, and
   at least one stationary fluid directing member having at least one axially extending surface configured for interacting with said internal surfaces and thereby creating an axial flow in said lubricating and/or cooling fluid from an input opening of said seal assembly, and creating an axial flow in said lubricating and/or cooling fluid towards an output opening of said seal assembly, wherein:

said interacting with said internal surfaces comprises a relative motion between a rotatable shaft or shaft sleeve and said stationary fluid directing member and, a first side of the at least one stationary fluid directing member facing the direction of rotation of said shaft sleeve or said shaft extends axially and obliquely from said output opening and thereby creates fluid flow in said lubrication and/or cooling fluid toward or away from the first and/or second sets of seal rings during rotation of said shaft sleeve or said shaft.

16. A system comprising a seal assembly for sealing a rotatable shaft entering a workspace, said seal assembly comprising:

first and second sets of seal rings separated by a space defined by the seal ring sets, an outer surface of a shaft sleeve or shaft, and an inner surface of a body circumventing the outer surface of the shaft sleeve or the shaft and filled with a lubricating and/or cooling fluid, wherein said outer surface of said shaft sleeve or said shaft is provided with grooves, or any other irregular surface, and wherein said space comprises at least one stationary fluid directing member having at least one axially extending surface interacting with said shaft sleeve or said shaft for creating an axial flow in said lubricating and/or cooling fluid from an input opening of said seal assembly, and creating an axial flow in said lubricating and/or cooling fluid towards an output opening of said seal assembly, wherein:

said interacting with said shaft sleeve or said shaft comprises a relative motion between the at least one stationary fluid directing member a the shaft sleeve or the shaft, and a first side of the at least one stationary fluid directing member facing the direction of rotation extends axially and obliquely from said output opening and thereby creates a fluid flow in said lubricating and/or cooling fluid toward or away from the first and/or second sets of seal rings during rotation of said shaft sleeve or said shaft.

17. The seal assembly according to claim 1, wherein the irregular surface provided on the outer surface of the shaft sleeve or shaft comprises grooves extending axially along the outer surface of the shaft sleeve or shaft.

18. The method according to claim 13, wherein the irregular surface provided on the outer surface of the shaft sleeve or shaft comprises grooves extending axially along the outer surface of the shaft sleeve or shaft.

19. The method according to claim 13, wherein said creating a flow in said lubricating and/or cooling fluid from said first and/or second sets of seal rings towards an output opening of said seal assembly is independent of the direction of the direction of rotation of the shaft sleeve or shaft relative to the at least one stationary fluid directing member.

* * * * *